Jan. 6, 1925.  
W. M. NIVENS  
COTTON CHOPPER  
Filed March 27, 1924
1,522,071
3 Sheets-Sheet 1
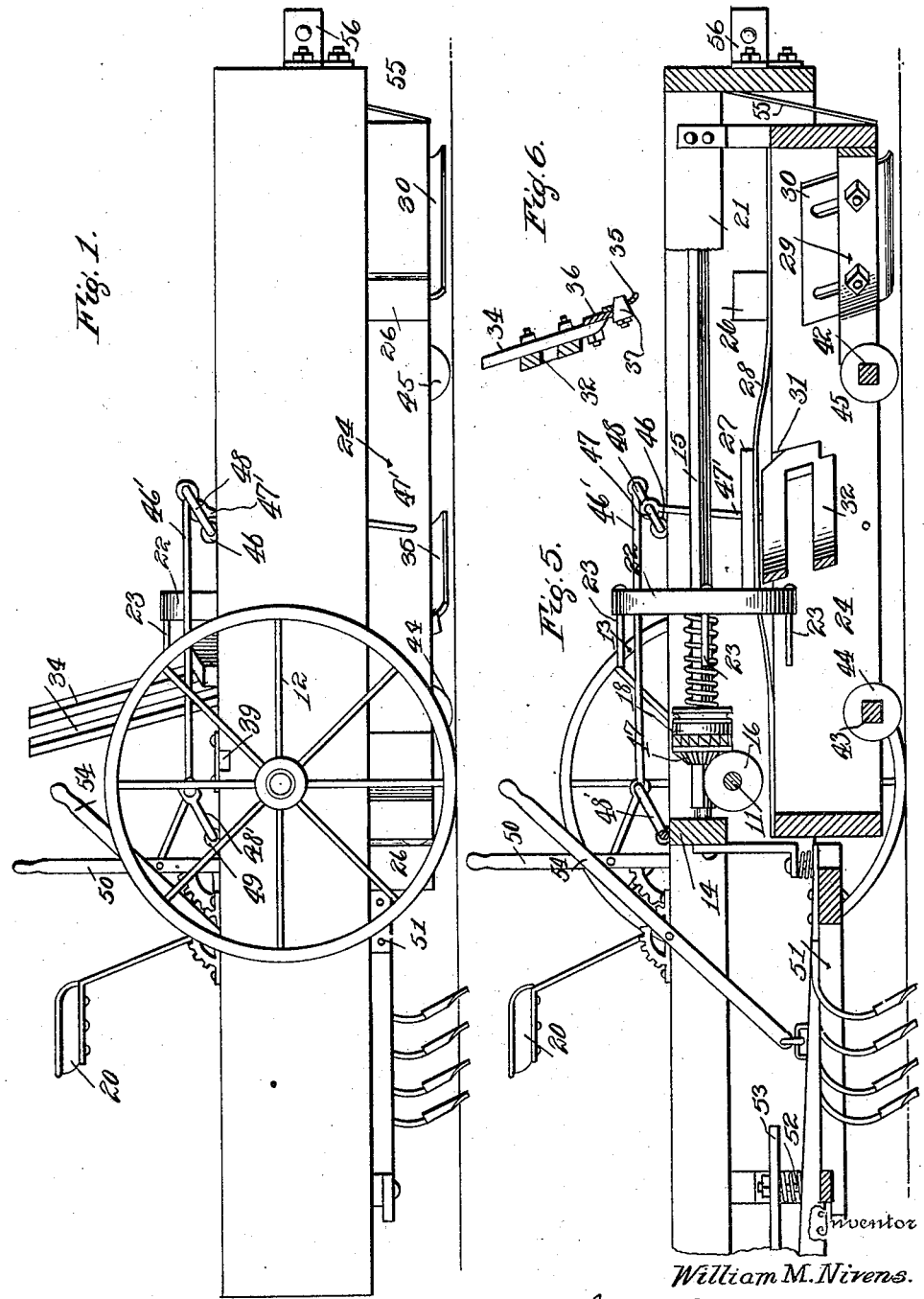
William M. Nivens.

Jan 6, 1925.
W. M. NIVENS
COTTON CHOPPER
Filed March 27, 1924
1,522,071
3 Sheets-Sheet 2
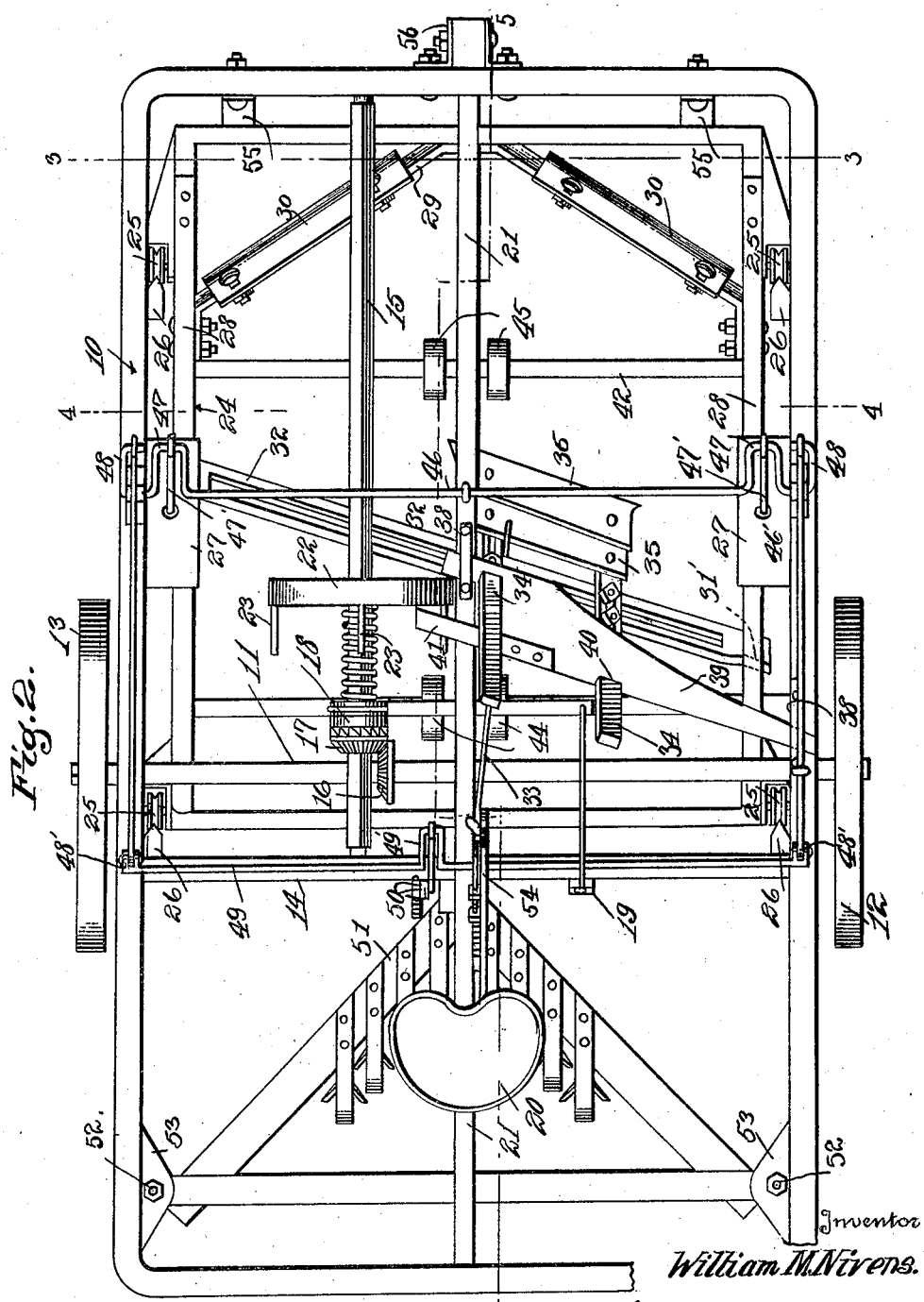

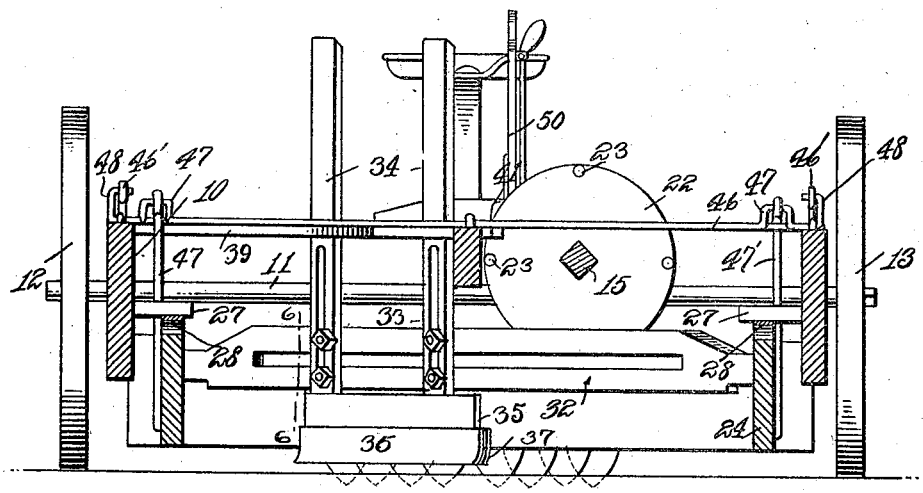
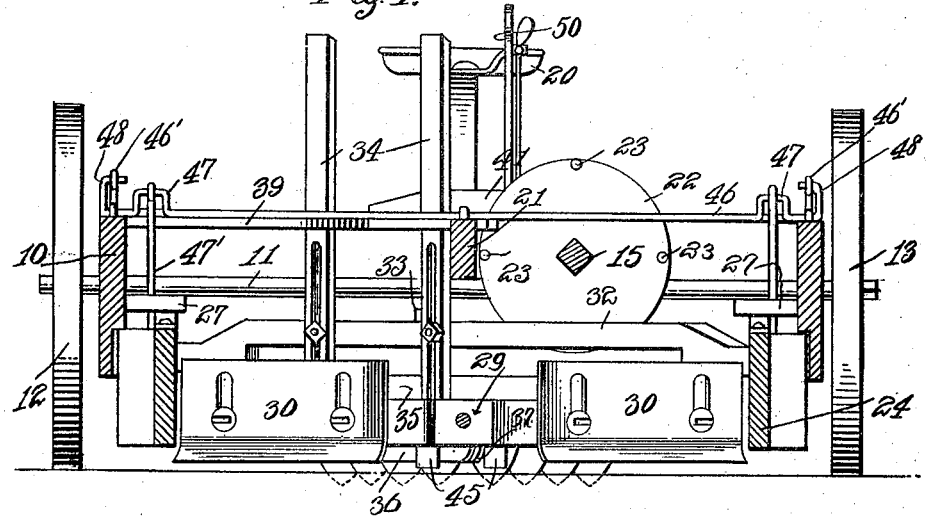

Patented Jan. 6, 1925.

1,522,071

UNITED STATES PATENT OFFICE.

WILLIAM M. NIVENS, OF MONROE, NORTH CAROLINA.

COTTON CHOPPER.

Application filed March 27, 1924. Serial No. 702,353.

*To all whom it may concern:*

Be it known that I, WILLIAM M. NIVENS, a citizen of the United States, residing at Monroe, in the county of Union, State of North Carolina, have invented certain new and useful Improvements in Cotton Choppers; and I do hereby declare the following to be a full, clear, and exact description of the invention, such as will enable others skilled in the art to which it appertains to make and use the same.

This invention relates to new and useful improvements in agricultural machines, and particularly to cotton choppers.

One object of the invention is to provide a machine of this character which will trim or level the edge portions of the soil of the row of plants, prior to the chopping operation.

Another object is to provide a machine of this character wherein the chopper is in comparatively constant action upon the row, with means intermittently actuated for moving the chopper laterally from the row, to permit certain plants to remain.

Another object is to provide a chopping element which is adjustable to permit the desired number of plants to remain in a hill.

A further object is to provide a machine of this character which includes a cultivator which is vertically adjustable within the frame for cultivating the rows after the chopping operation.

A still further object is to provide a device of this character which includes a frame carrying the row leveler and chopper, and which is arranged to be adjusted to suit the rise and fall in the surface of the land, over which the machine is traveling.

Other objects and advantages will be apparent from the following description when taken in connection with the accompanying drawings.

In the drawings:

Figure 1 is a side elevation of a machine made in accordance with the present invention.

Figure 2 is a top plan view of the machine.

Figure 3 is a vertical transverse sectional view on the line 3—3 of Figure 2.

Figure 4 is a vertical transverse sectional view on the line 4—4 of Figure 2.

Figure 5 is a vertical longitudinal central sectional view on the line 5—5 of Figure 2.

Figure 6 is an enlarged vertical sectional detail view on the line 6—6 of Figure 3, through the chopping element.

Referring particularly to the accompanying drawings, 10 represents a horizontal rectangular frame, through the intermediate portion of which extends the axle 11, having the wheel 12 rotatably supported on one end and the wheel 13 fixed on the other end, so that the axle will turn with this latter wheel. Extending between the longitudinal side bars of the frame, in rear of the axle 11, is a transverse bar 14, and extending longitudinally of the frame, and journaled at its ends in the front cross member of the frame and in said member 14, is a shaft 15. On the axle 11 there is mounted a bevel gear 16 which meshes with a similar gear 17 on the shaft 15, and through which means the said shaft is driven. A clutch 18 is associated with this gear 17, operable by means of the foot pedal 19, which is supported on the transverse bar 14, within convenient reach of the driver from the seat 20, which is mounted on the longitudinal central beam 21. On the shaft 15 there is fixed a disk 22, and projecting at right angles from the rear face of said disk, and adjacent the periphery thereof, are the pins 23, the purpose of which will be explained later herein.

Disposed within the main frame, forwardly of the transverse bar 14, is a rectangular frame 24, the same having antifriction rollers 25 on its sides engaging with guides or slideways 26, carried by the sides of the main frame. Extending horizontally inward from the sides of the main frame are the brackets 27, and secured to the lower sides of these brackets are the longitudinally extending leaf springs 28, the opposite ends of which press on the upper edge faces of the side members of the inner frame 24. Secured to the center of the rear face of the forward cross members of the frame 24 is the apex of a V-shaped member 29, the ends of the arms of which are secured to the side members of the frame 24. Adjustably secured to the forward face of each of the arms of the member 29 is a scraper blade 30, the forward edges or ends of which are disposed in spaced relation at opposite sides of the longitudinal center of the entire machine. Formed in the side members of the frame 24, in staggered relation to each other are the vertical slots 31, and disposed in these slots are the reduced ends of the longitudinally slotted bar 32, said bar being arranged to slide vertically in the slots, and to slide through the slots, transversely of the frame. A spring 33, connected to the bar 32, and to the bar 21, yieldably maintains the bar 32 in one limit of its transverse slidable movement. Secured for vertical adjustment on the bar 32 are the vertical parallel bars 34, to the lower ends of which is secured a blade 35. Secured to the forward face of this blade is a metal plate or shoe 36, which performs the function of digging or chopping out the unnecessary cotton plants. To the rear of the shoe 36, and adjustable toward and away therefrom, there is secured a second shoe or plate 37.

Carried by the upper edge of one of the side members of the main frame, and by the upper edge of the longitudinal central beam 21, are the brackets 38, and slidable in these brackets are the ends of the transverse bar 39, said bar having a pair of openings 40 in which are received the upper portions of the parallel bars 34. On the inner end of the bar 39 is an outwardly extending lug 41, which is so arranged that it is adapted to be engaged by the pins 23, successively, for the purpose of moving the bar 32, and the chopper, laterally out of the row of plants. Normally the chopper travels in the row to scrape out the plants for the required distance, when a pin 23 will strike the lug 41, move the bar 32, and thus withdraw the chopper from the row. This withdrawal of the chopper from the row, permits a group of plants to remain standing, and immediately after the chopper has passed these standing plants, the spring 33 draws the chopper back into the row, for further chopping. As the chopper moves back into the row the blades or shoe 36 and 37 dig transversely of the row, and thus remove certain of the plants. By adjusting the rear shoe 37 to a greater distance to the rear of the shoe 36, this rear shoe will dig out some of the foremost of the group of plants which would have remained standing, with the result that the required number of plants can be left in a hill.

Carried by the frame 24, and extending transversely thereof, forwardly and rearwardly of the chopper, are the shafts 42 and 43, on which are respectively mounted the spaced rollers 44 and 45, said rollers being so spaced as to straddle the row of plants, and pack down the soil at opposite sides thereof, before and after the operation of the chopper.

Mounted on the forward portion of the frame 10, and extending transversely thereof, directly over the brackets 27, is a rock shaft 46, having the cranks 47, adjacent the opposite ends, and the terminal radial arms 48. Longitudinal links 46' are disposed above the sides of the main frame 10, and have their forward ends pivotally connected with the outer ends of the said radial arms 48, and their rear ends connected to the radial arms 48', of the rock shaft 49. Connected to the cranks 47, are the links 47' which serve to lift the frame 24, when the shaft 46 is rocked in one direction. A lever 50 is supported on the transverse bar 14, and said lever is operatively connected with the central crank 49' of the rock shaft 49, for the purpose of rocking said shaft 49 to cause the raising and lowering of the frame 24.

Suspended in the rear portion of the main frame 10, rearwardly of the bar 14, is a cultivator frame 51, said frame being provided with upwardly extending rods 52, slidably disposed through guide eyes 53, on the sides of the frame 10. A lever 54 is mounted on the central bar 21, and is operatively connected with the cultivator frame 51, for the purpose of raising and lowering the cultivator frame.

Carried by the front cross member of the main frame 10 are the springs 55 which bear against the front of the frame 24, and urge latter frame rearwardly so that the rollers thereof will properly gear against the guides 26.

To the front of the main frame there is connected a suitable draft means 56, for attachment of draft animals.

What is claimed is:

1. A cotton chopping machine including a main frame, an auxiliary frame, scraping means on the auxiliary frame, chopping means on the auxiliary frame, said chopping means being resiliently maintained in chopping relation to a row, and means for intermittently moving the chopping means laterally out of a row.

2. A cotton chopping machine including a frame, a bar slidable transversely in the frame, resilient means for urging the bar in one direction, means for intermittently urging the bar in the opposite direction, and a chopping element carried by the bar and including a pair of ground engaging shoes, one of the shoes being adjustable toward and away from the other shoe.

3. A cotton chopping machine including a frame, a transversely movable support in the frame, and a cotton chopping element carried by the support, said chopping element including a blade, a shoe carried by the blade in position to extend transversely of a row, and a second shoe carried by the first shoe in parallel relation rearwardly thereof and being adjustable toward and away from the first shoe.

In testimony whereof I affix my signature, in the presence of two witnesses.

WILLIAM M. NIVENS.

Witnesses:
 EFFIE NIVENS,
 V. H. NIVENS.